No. 682,050. Patented Sept. 3, 1901.
W. ERBEN.
APPARATUS FOR SEPARATING SOLVENT VAPOR FROM AIR.
(Application filed July 15, 1901.)
(No Model.)
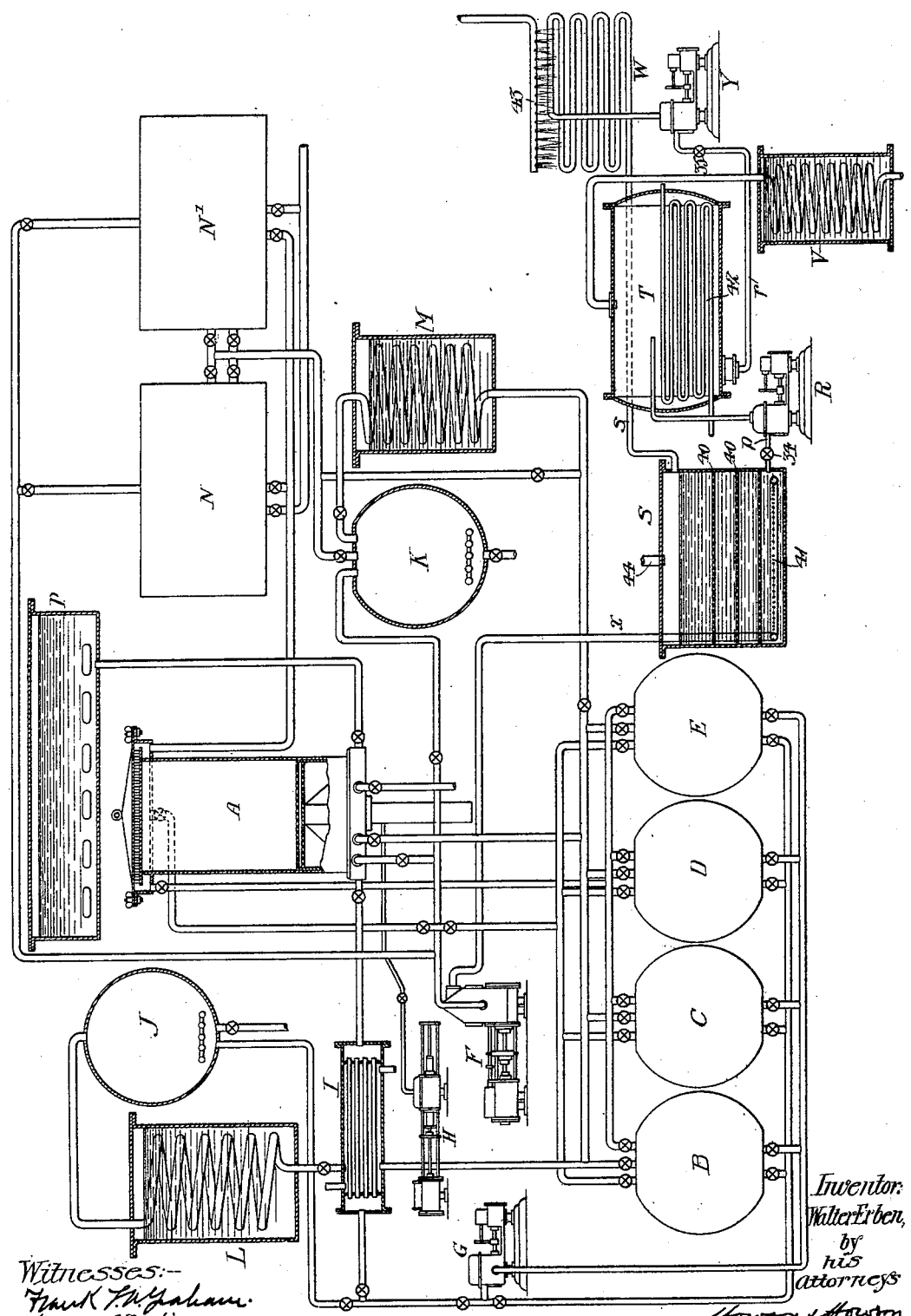

UNITED STATES PATENT OFFICE.

WALTER ERBEN, OF PHILADELPHIA, PENNSYLVANIA.

APPARATUS FOR SEPARATING SOLVENT VAPOR FROM AIR.

SPECIFICATION forming part of Letters Patent No. 682,050, dated September 3, 1901.

Original application filed October 4, 1899, Serial No. 732,578. Divided and this application filed July 15, 1901. Serial No. 68,412. (No model.)

*To all whom it may concern:*

Be it known that I, WALTER ERBEN, a citizen of the United States, residing in Philadelphia, Pennsylvania, have invented certain Improvements in Apparatus for Extracting Grease from Wool, (the same being a division of my application, Serial No. 732,578, filed October 4, 1899,) of which the following is a specification.

My invention relates to certain improvements in or addition to that process of extracting grease from wool in which a volatile liquid solvent is employed and in which air is passed through the extracting-keir at some stage of the process, so as to take up more or less solvent vapor, the air being passed through oil or other liquid in order to condense this vapor and free it from the air before permitting the latter to escape.

The object of my invention is to so conduct this part of the process that thorough extraction of the solvent vapor from the air may be effected with the use of a minimum quantity of oil, that portion of the volume of oil through which air is caused to pass being constantly maintained in the best condition for extracting the solvent vapor from said air.

The accompanying drawing represents in diagrammatic form grease-extracting apparatus constructed for carrying out my present invention.

As a solvent for the grease I may use any of the light hydrocarbons which are capable of effecting the desired purpose, preferring for this purpose the ordinary naphtha, which will be hereinafter referred to simply as "solvent."

In the drawing, A represents the extracting vessel or keir, and B, C, D, and E a series of tanks for containing solvent. In connection with the extracting-keir and solvent-tanks are employed a vacuum-pump F, a solvent-pump G, a high-pressure water-pump H, a solvent-heater I, a solvent-still J, with its condenser L, and, if desired, a second solvent-still K, with its condenser M. I also employ in connection with each keir two settling vessels N N' and a heater P for the wash-water. There is also a solvent-vapor trap S, and, in connection therewith, a still T, with its condenser V, a cooling device W, and pumps R and Y.

It will not be necessary in this specification to describe the general construction and operation of the apparatus, as this forms no part of my present invention and is fully set forth in the application for patent filed by me on the 4th day of October, 1899, Serial No. 732,578, of which this application is a division. It is sufficient to say that the various pipes and pumps provide for a flow of air through the mass of wool contained in the keir, my present invention having reference solely to the treatment of this air after it has been passed through the keir. The discharge-pipe $x$ of the vacuum-pump F delivers into the solvent-vapor trap S, the lower portion of which is in communication through the valved pipe $p$ with the pump R, which discharges into the still T, the lower portion of the latter being in communication through the pipe $r$ with the pump Y, which discharges through a cooling-coil W into the solvent-vapor trap S through a pipe $s$. A valve 34 governs the flow through the pipe $p$ from the solvent-vapor trap S to the pump R, and a valve 35 governs the flow through the pipe $r$ from the still T to the pump Y. The solvent-vapor trap S consists of a casing containing a series of superposed perforated partitions 40, and the discharge-pipe $x$ of the vacuum-pump terminates at the bottom of the vessel S in a perforated discharge-pipe 41, so that the air enters said vessel S in the form of a number of fine jets or sprays, and as it passes upwardly is continuously broken up and separated by the perforated partitions 40, so that all portions of the air are brought into intimate contact with the liquid contained in the trap. This may be any liquid which will absorb vapor brought into contact with it, the liquid which I prefer to use for the purpose being a heavy hydrocarbon oil, such as is used for fuel, as I find that such heavy hydrocarbon oil will absorb and retain a considerable percentage of lighter hydrocarbon. Hence if solvent vapor is contained in the air discharged from the vacuum-pump such solvent vapor will be condensed and absorbed by the heavy hydrocarbon oil in the vessel S. I have found that as the heavy hydrocarbon oil absorbs the lighter hydrocarbon it descends. Hence I provide between the lower portion of the vessel S and the pump R the pipe *p*, having the valve 34, so that the liquid can be withdrawn from the lower portion of the vessel S, either continuously or at any desired intervals. The discharge-pipe of the pump R delivers into the still T, which has a heating-coil 42, whereby the temperature of the still may be raised to such a point as to vaporize the solvent, which after passing through the condenser V is returned to any desired one of the solvent-tanks B, C, D, or E by means of a suitable pump. The heavy hydrocarbon oil is withdrawn from the still G through the pipe *r* and is forced by the pump Y into the cooling-coil W, which is maintained at a low temperature, either by means of a flow of water from the perforated pipe 43 or in any other available way, the discharge end of the coil communicating through the pipe *s* with the vessel S. A continuous cycle of operations is thus provided, whereby a circulation of the heavy hydrocarbon oil through the vessel S is maintained and its saturation with the solvent is prevented, said heavy hydrocarbon being always maintained in condition to absorb and retain any solvent vapors which may be brought into contact with it and the air freed from the solvent vapor being permitted to escape through the discharge-pipe 44 at the top of the vessel S.

Having thus described my invention, I claim and desire to secure by Letters Patent—

The combination of the solvent-vapor trap, means for supplying solvent-impregnated air thereto, the still, the cooler, liquid-forcing devices and connecting-pipes, whereby the oil from the trap may be caused to travel in a circuit from the trap to the still, from the latter to the cooler and from the latter back to the trap, substantially as specified.

In testimony whereof I have signed my name to this specification in the presence of two subscribing witnesses.

WALTER ERBEN.

Witnesses:
  F. E. BECHTOLD,
  JOS. H. KLEIN.